(12) United States Patent
Hu et al.

(10) Patent No.: US 8,540,202 B2
(45) Date of Patent: Sep. 24, 2013

(54) SUPPORT MECHANISM

(75) Inventors: Wu-Zhu Hu, Shenzhen (CN); Wu-Qi Li, Shenzhen (CN); Ben-Xiang Zhao, Shenzhen (CN); Tang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 21 days.

(21) Appl. No.: 13/316,904

(22) Filed: Dec. 12, 2011

(65) Prior Publication Data

US 2013/0001381 A1  Jan. 3, 2013

(30) Foreign Application Priority Data

Jun. 29, 2011  (CN) .......................... 2011 1 0179261

(51) Int. Cl.
*A45D 19/04* (2006.01)
(52) U.S. Cl.
USPC ................ 248/371; 248/168; 248/460; 108/6
(58) Field of Classification Search
USPC ...................... 248/168, 456, 453; 108/6, 330; D14/447
See application file for complete search history.

(56) References Cited

U.S. PATENT DOCUMENTS

| | | | | |
|---|---|---|---|---|
| 2,887,348 A * | 5/1959 | Sadowsky | ..................... | 108/124 |
| 3,376,009 A * | 4/1968 | Domino | ........................ | 248/456 |
| 4,248,161 A * | 2/1981 | Adair et al. | ........................ | 108/6 |
| 4,726,556 A * | 2/1988 | Weir | ............................. | 248/454 |
| 4,767,015 A * | 8/1988 | Ho | ................. | 215/372 |
| 5,029,784 A * | 7/1991 | Blahout | ........................ | 248/166 |
| 5,129,616 A * | 7/1992 | Carson | .......................... | 248/457 |
| D333,390 S * | 2/1993 | McCauley | ..................... | D6/429 |
| D333,991 S * | 3/1993 | Lee | ................. | D10/62 |
| 5,253,840 A * | 10/1993 | Sheremetta | ................... | 248/452 |
| 5,607,135 A * | 3/1997 | Yamada | ........................ | 248/456 |
| 6,019,050 A * | 2/2000 | Ranta | ................................ | 108/6 |
| D470,336 S * | 2/2003 | Malizia | ........................ | D6/462 |
| 6,532,147 B1 * | 3/2003 | Christ, Jr. | ................. | 361/679.27 |
| 6,920,039 B2 * | 7/2005 | Mochizuki et al. | ........ | 361/679.2 |
| 7,086,632 B2 * | 8/2006 | Hsieh | ........................ | 248/188.1 |
| D562,572 S * | 2/2008 | Nothel et al. | .................. | D6/310 |
| D596,187 S * | 7/2009 | Martell | ........................ | D14/447 |
| D635,797 S * | 4/2011 | Xingyin | ........................ | D6/420 |
| D659,147 S * | 5/2012 | Hu et al. | ........................ | D14/447 |
| 8,186,639 B2 * | 5/2012 | Wang | ........................ | 248/371 |
| D668,256 S * | 10/2012 | Matteo | ......................... | D14/447 |
| 2008/0006753 A1 * | 1/2008 | Campagnoli et al. | ......... | 248/398 |
| 2008/0105811 A1 * | 5/2008 | Denby | .......................... | 248/460 |
| 2013/0001393 A1 * | 1/2013 | Hu et al. | ........................ | 248/371 |

* cited by examiner

*Primary Examiner* — Terrell McKinnon
*Assistant Examiner* — Daniel J Breslin
(74) *Attorney, Agent, or Firm* — Altis Law Group, Inc.

(57) ABSTRACT

A support mechanism for supporting an electronic device is disclosed. The support mechanism, comprises at least one connecting assembly; and at least one pair of support portions, each of the at least one pair of support portions comprising a first support member, a connecting member comprising a first connecting end and a second connecting end, and a second support member; wherein the first support member is rotatably connected to the connecting member at the first connecting end, the second support member is rotatably connected to the second connecting member at the second connecting end, and the second support members of each of the at least one pair of support portions are rotatably connected to each other by the at least one connecting assembly.

19 Claims, 8 Drawing Sheets

SUPPORT MECHANISM

BACKGROUND

1. Technical Field

The present disclosure relates to support mechanisms, and more particularly, to a support mechanism for supporting an electronic device.

2. Description of Related Art

Electronic devices such as tablet PCs and electronic books are popular due to their portability and a multiplicity of entertainment functions. When in use, such an electronic device may be handheld, or placed on a desk or a human lap. This may not achieve an optimum display angle and may also be inconvenient. In order to solve the problem, a plurality of support mechanisms exist to support the electronic device. However, these support mechanisms may be complicated and still large in size even in a folded state. Such support mechanisms may not be easily portable.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
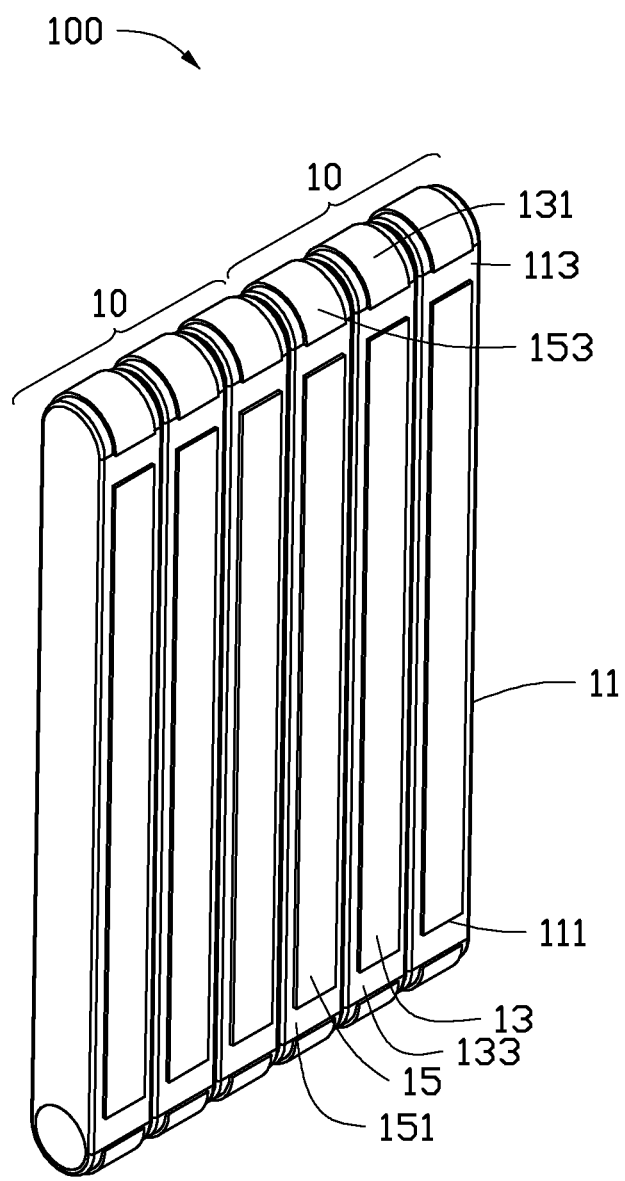
FIG. 1 is an isometric view of an embodiment of a folded support mechanism.
Figure 2:
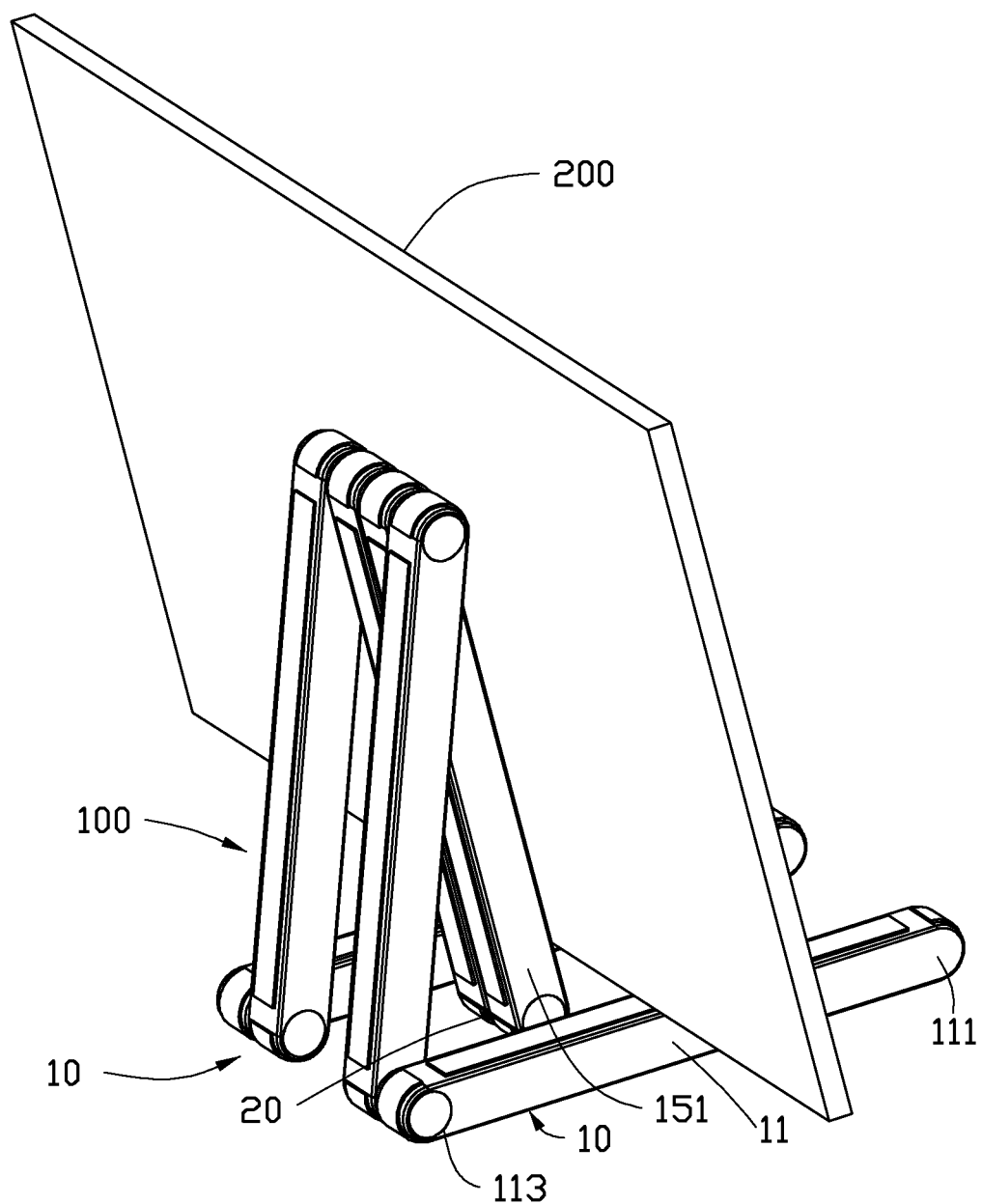
FIG. 2 is an isometric view of the assembled support mechanism of FIG. 1 supporting a tablet PC in a first support position.

Referring to FIGS. 1 and 2, an embodiment of a support mechanism 100 comprises a pair of support portions 10 and a connecting assembly 20. One of the pair of support portions 10 is rotatably connected to the other one of the support portions 10 via the connecting assembly 20. The support mechanism 100 can be folded into a flat rectangle for carrying, as shown in FIG. 1. The support mechanism 100 can be unfolded into a variety of support positions as shown in FIGS. 2, and 5-7, to support an electronic or other device. The support mechanism 100 may be used to support a tablet PC or an electronic book. In the embodiment, the support mechanism 100 supports a tablet PC.

Each support portion 10 comprises a first support member 11, a connecting member 13, a second support member 15, two pivotal assemblies 17, a plurality of frictional members 18, and a plurality of anti-skidding members 19. The first support member 11, the connecting member 13, and the second support member 15 are connected to each other, in that order, via the two pivotal assemblies 17.

Figure 3:
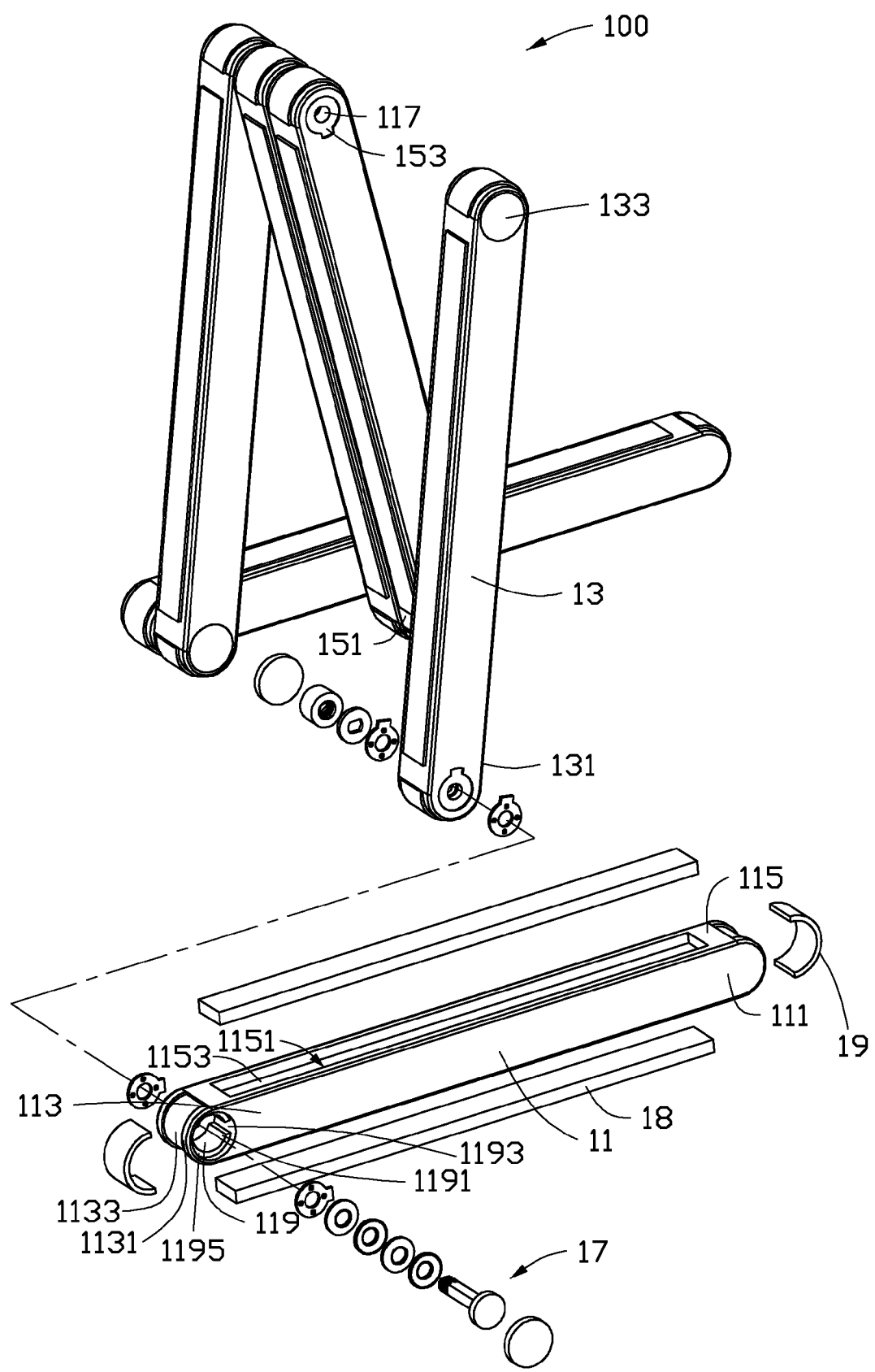
FIG. 3 is an exploded, isometric view of the support mechanism of FIG. 2.
Figure 4:
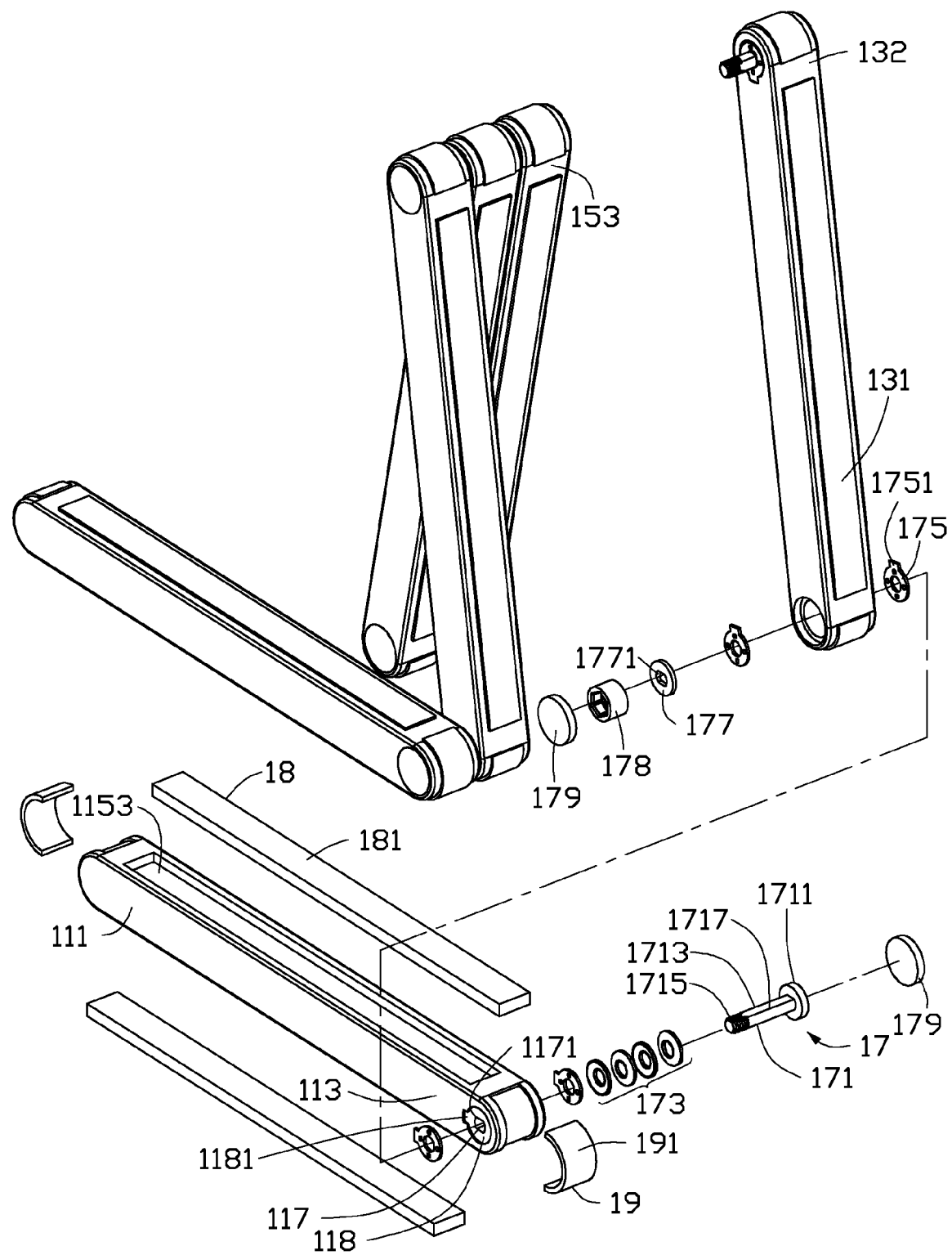
FIG. 4 is similar to FIG. 3, but viewed from another aspect.

Referring to FIGS. 3 and 4, the first support member 11 has a shape of a square bar, and comprises a first support end 111, a first joint end 113, and two opposite side surfaces 115 connecting the first support end 111 and the first joint end 113. The first support end 111 is at a support end of the first supper member 11. The first joint end 113 is at a joint end, opposite to the support end of the first support member 11. The two opposite side surfaces 115 are parallel to each other, and the support end and the joint ends of the first support member 11 are in all respects symmetrical. The first joint end 113 is smoothly rounded, and comprises an arcuate end surface 1131. A cross section of the arcuate end surface 1131 is a semicircle. The first joint end 113 defines an arcuate groove 1133 on the arcuate end surface 1131. The arcuate groove 1133 extends along the arcuate end surface 1131 and has an even depth for receiving one of the pair of anti-skidding members 19. The first support end 111 is similar to the first joint end 113. Each of the two side surfaces 115 is tangential from an end of the arcuate end surface 1131. The first support member 11 defines a mounting groove 1151 on each of the two opposite side surfaces 115. A frictional member 18 is received in the mounting groove 1151. The mounting groove 1151 defines a bottom surface 1153. The mounting groove 1151 extends from the first support end 111 to the first joint end 113 and has an even depth. The bottom surface 1153 is parallel to each of the two opposite side surfaces 115. The first support member 11 further defines a first pivotal hole 117, a restricting depression 118, and a second pivotal hole 119 in the first joint end 113. The first pivotal hole 117 and the second pivotal hole 119 are aligned through opposite sides of the first joint end 113. An internal diameter of the second pivotal hole 119 is greater than an internal diameter of the first pivotal hole 117. The restricting depression 118 is defined at one side of the first joint end 113 away from the second pivotal hole 119. Specifically, the restricting depression 118 and second pivotal hole 119 communicate with the first pivotal hole 117, and are located at the two ends of the first pivotal hole 117. An internal diameter of the restricting depression 118 is greater than the internal diameter of the first pivotal hole 117.

In the embodiment, the first joint end 113 comprises a pair of restricting surfaces 1171 on an inner side surface of the first pivotal hole 117 between the restricting depression 118 and the second pivotal hole 119. The restricting depression 118 and second pivotal hole 119 are cylindrical holes. The first joint end 113 further defines a restricting groove 1181 at one side of the restricting depression 118, and comprises a latching portion 1191 located on an inner surface of the second pivotal hole 119. The restricting groove 1181 communicates with the restricting depression 118. The latching portion 1191 is a cylindrical shell resembling an incomplete circle. An incomplete portion of a cylinder of the latching portion 1191 defines a latching groove 1193. The latching groove 1193 communicates with the second pivotal hole 119. The latching portion 1191 further comprises an annular resisting surface 1195 outside of the second pivotal hole 119. In the illustrated embodiment, the latching portion 1191 is formed integrally with first joint end 113.

The connecting member 13 is similar to the first support member 11, except that the connecting member 13 has two connecting ends. The connecting member 13 comprises a first connecting end 131 and a second connecting end 133. The first connecting end 131 and the second connecting end 133 both define a pivotal hole. The second support member 15 is similar to the connecting member 13. The second support member 15 comprises a second support end 151 and a second joint end 153. The pivotal holes of the first connecting end 131 and the second joint end 153 are circular and do not contain any restrictive surfaces. The first connecting end 131 is rotatably connected to the first joint end 111 via one of the two pivotal assembles 17. The second connecting end 133 is rotatably connected to the second joint end 153 via another one of the two pivotal assemblies 17.

Each of the two pivotal assemblies 17 comprises a pivotal member 171, a plurality of resilient washers 173, a plurality of restricting plates 175, a flat washer 177, a locking member 178, and a sealing cover 179.

The pivotal member 171 is received in the first pivotal hole 117, and comprises a head portion 1711, a rod portion 1713 beneath the head portion 1711, and an engaging portion 1715 defined at a distal end of the rod portion 1713. The rod portion 1713 comprises two restricting surfaces 1717 on opposite sides. The two restricting surfaces 1717 are flat and parallel. The plurality of resilient washers 173 are dished washers sleeved on the rod portion 1713. Each of the plurality of restricting plates 175 is an annular gasket and comprises a restricting protrusion 1751 protruding from an circular edge of each of the plurality of restricting plates 175. The flat washer 177 is annular and defines a latching hole 1771 capable of engaging with the two restricting surfaces 1717 of the pivotal member 171. The flat washer 177 is non-rotatably sleeved on the rod portion 1713 via the latching hole 1771 and engages with the two restricting surfaces 1717. The locking member 178 is capable of engaging with the engaging portion 1715 of the pivotal member 171 to connect the first connecting end 131 of the connecting member 13 to the first joint end 113 of the first support member 11. The sealing cover 179 is a round plate received in the second pivotal hole 119. In the embodiment, the pivotal member 171 is a bolt, the locking member 178 is a nut, and the sealing cover 179 is a circular gasket made of silica gel.

Each of the pair of frictional members 18 is a strip of permanently tacky or sticky material, received in the mounting groove 1151, and comprises a frictional surface 181 standing proud of the mounting groove 1151. The frictional surface 181 deviates from the bottom surface 1153 of the first support member 11. In the embodiment, the frictional member 18 is rectangular and made of silica gel.

Each of the two anti-skidding members 19 is received in the arcuate groove 1133. Each of the two anti-skidding members 19 comprises a positioning surface 191 with a high coefficient of friction. The two anti-skidding members 19 are capable of maintaining the support portion 10 in almost any shape or fineness of adjustment on a desk while the positioning surface 191 is placed on the desk. In the embodiment, each of the two anti-skidding members 19 is circular and made of silica gel.

The connecting assembly 20 is similar to each of the two pivotal assemblies 17. The second support end 153 of the at least one pair of support portions 10 is connected to each other rotatably via the connecting assembly 20.

Figure 5:
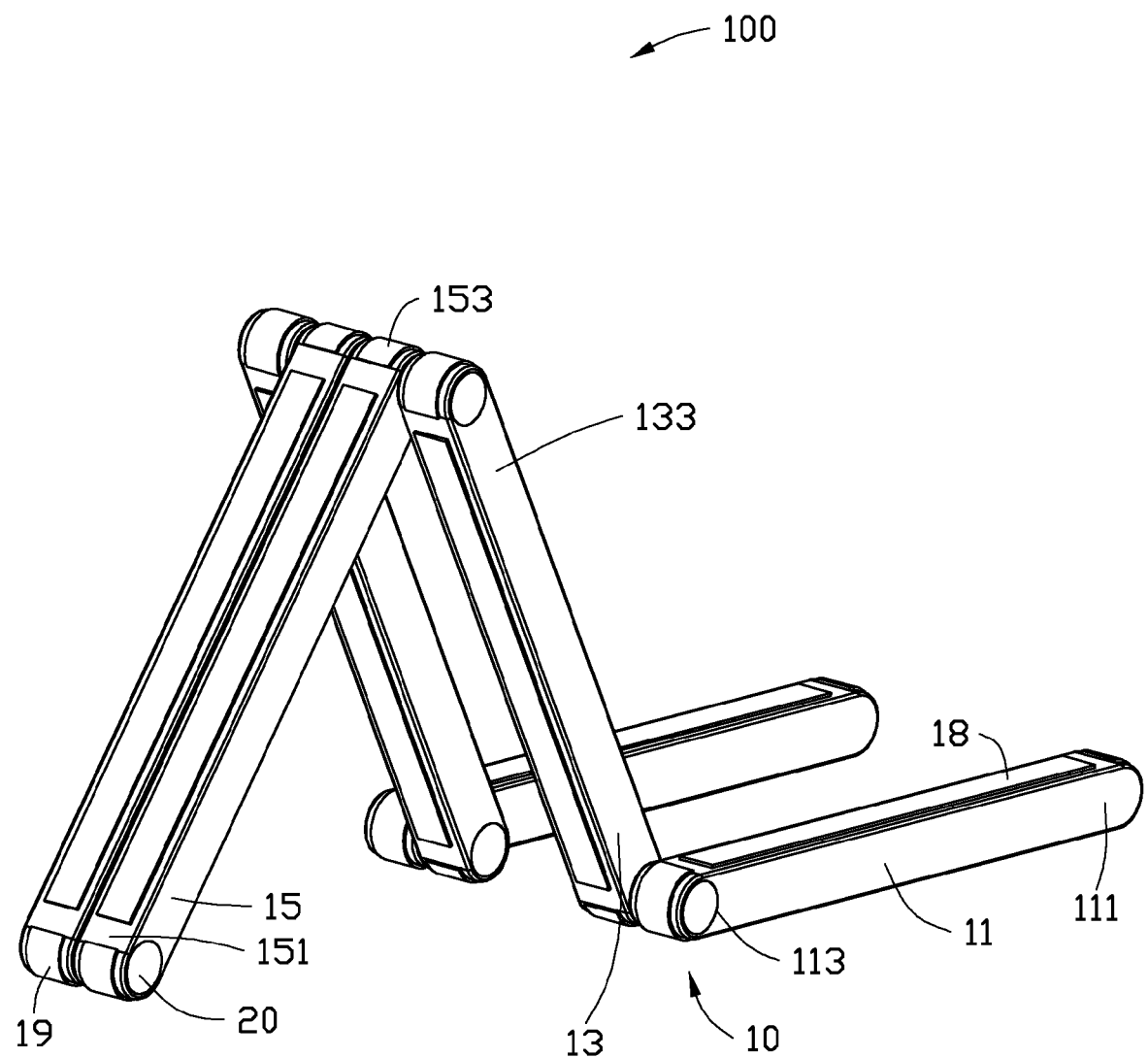
FIG. 5 is an isometric view of the assembled support mechanism of FIG. 1 in a second support position.

Also referring to FIG. 5, in assembling, each of the pair of frictional members 18 is received in the mounting grooves 1151 of the first support member 11 with the frictional surface 181 exposed outward. The frictional surfaces 181 of the pair of frictional members 18 are coplanar with the two opposite side surfaces 115 of the first support member 11. Each of the pair of anti-skidding members 19 are received in the arcuate grooves 1133 of the first support member 11. Pairs of frictional members 18 and pairs of anti-skidding members 19 are similarly mounted on both the connecting member 13 and the second support member 15.

The first joint end 113 of the first support member 11 is aligned to the first connecting end 131 of the connecting member 13. Each of the pair of restricting plates 175 is received in each of the restricting depressions 118 of the first joint end 113 and the first connecting end 131. The restricting protrusion 1751 of each of the pair of restricting plates 175 is received in the restricting groove 1181. The first pivotal hole 117 of the first joint end 113 and the first connecting end 131 are aligned and interconnected with each of the restricting depression 118 faces each other. The plurality of resilient washers 173 are sleeved on the rod portion 1713 of the pivotal member 171. One of the pair of restricting plates 175 is sleeved on the pivotal member 171 adjacent to the engaging portion 1715. The pivotal member 171 extends into two of the first pivotal hole 117 with the head portion 1711 resisting the resisting surface 1195 of the latching portion 1191, to enable the plurality of resilient washers 173 and the restricting plate 175 to be received in the second pivotal hole 119. Each of the pair of restricting surfaces 1171 of the first joint end 113 engages with the restricting surface 1717 of the pivotal member 171 to non-rotatably connect the pivotal member 171 to the first support member 11.

One of the pair of restricting plates 175 and a flat washer 177 are sleeved on the pivotal member 171, and received in the second pivotal hole 119 of the first connecting end 131. The restricting protrusion 1751 of each of the pair of restricting plates 175 is received in the latching grooves 1193 of the latching portions 1191. The locking member 178 engages with the engaging portion 1715 of the pivotal member 171, and the sealing cover 179 is mounted in each side of the second pivotal hole 119 to seal the second pivotal hole 119. The first support member 11 is rotatably connected to the first connecting end 131 of the connecting member 13, and the second support member 15 is similarly rotatably connected to the second connecting end 133 of the connecting member 13. Assembling of one of the at least one pair support portions 10 is completed. Another one of the support portions 10 may be assembled in the same way. Each of the second joint end 153 of each of pair support portions 10 is rotatably connected to each other via the connecting assembly 20. Assembling of the support mechanism 100 is accomplished. In the embodiment, two of the second support members 15 are side by side, sandwiched between two of the first support members 11.

When in use, two of the first support members 11 are settled on a desk via the pair of frictional members 18 with the two anti-skidding members 19 resting on the desk. Two of the connecting members 13 are rotated together to a predetermined angle relative to the first support members 11, and two of the second support members 15 are rotated together to another predetermined angle relative to the connecting members 13. The second support members 15 rest on the desk via two of the second support ends 153. The tablet PC resists the frictional members 18 of the first support members 11 with a first edge, and the second connecting ends 133 of the connecting members 13 support a second edge of the tablet PC opposite to the first edge, such that the tablet PC is stable and securely positioned.

Figure 6:
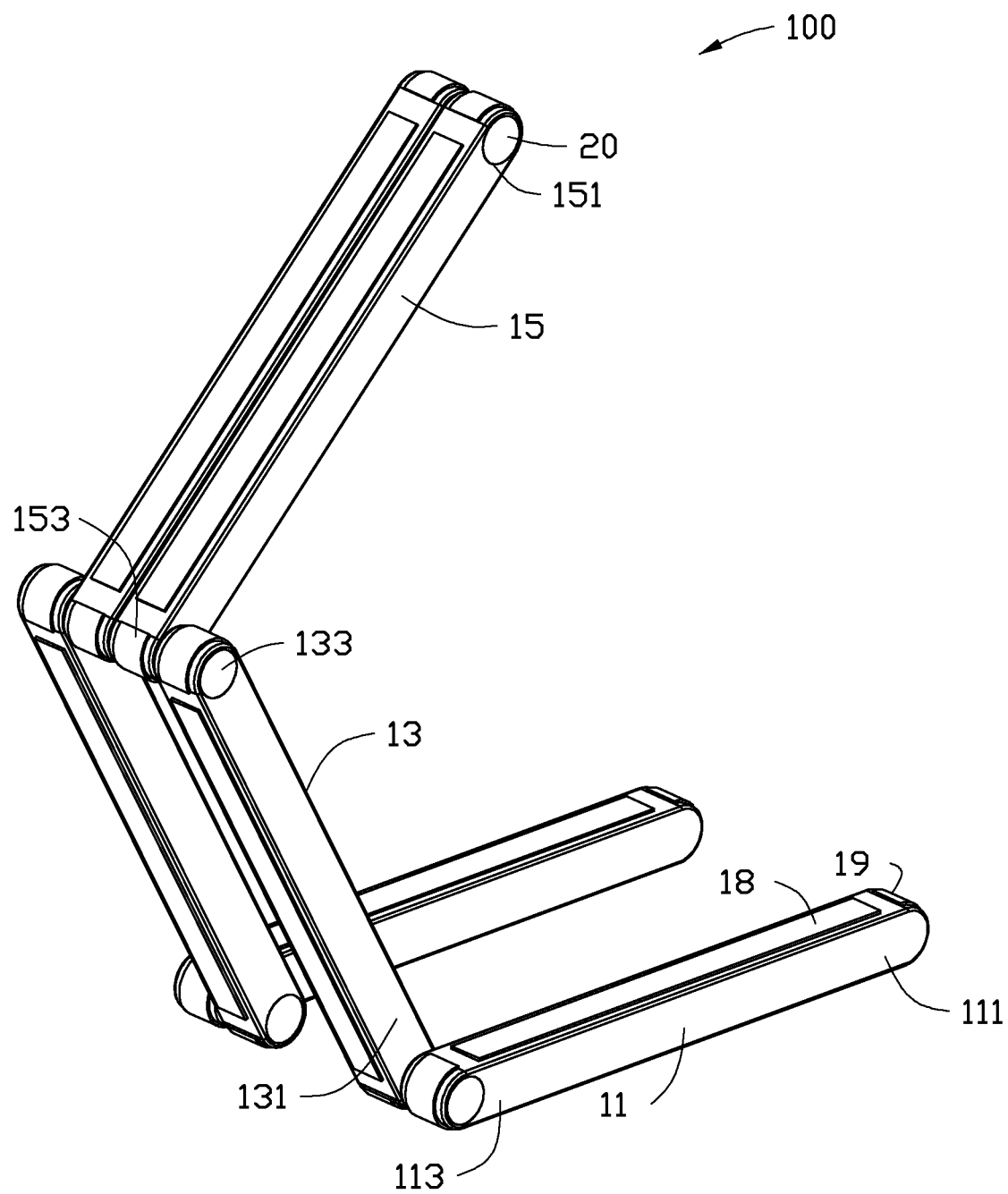
FIG. 6 is an isometric view of the assembled support mechanism of FIG. 1 in a third support position.
Figure 7:
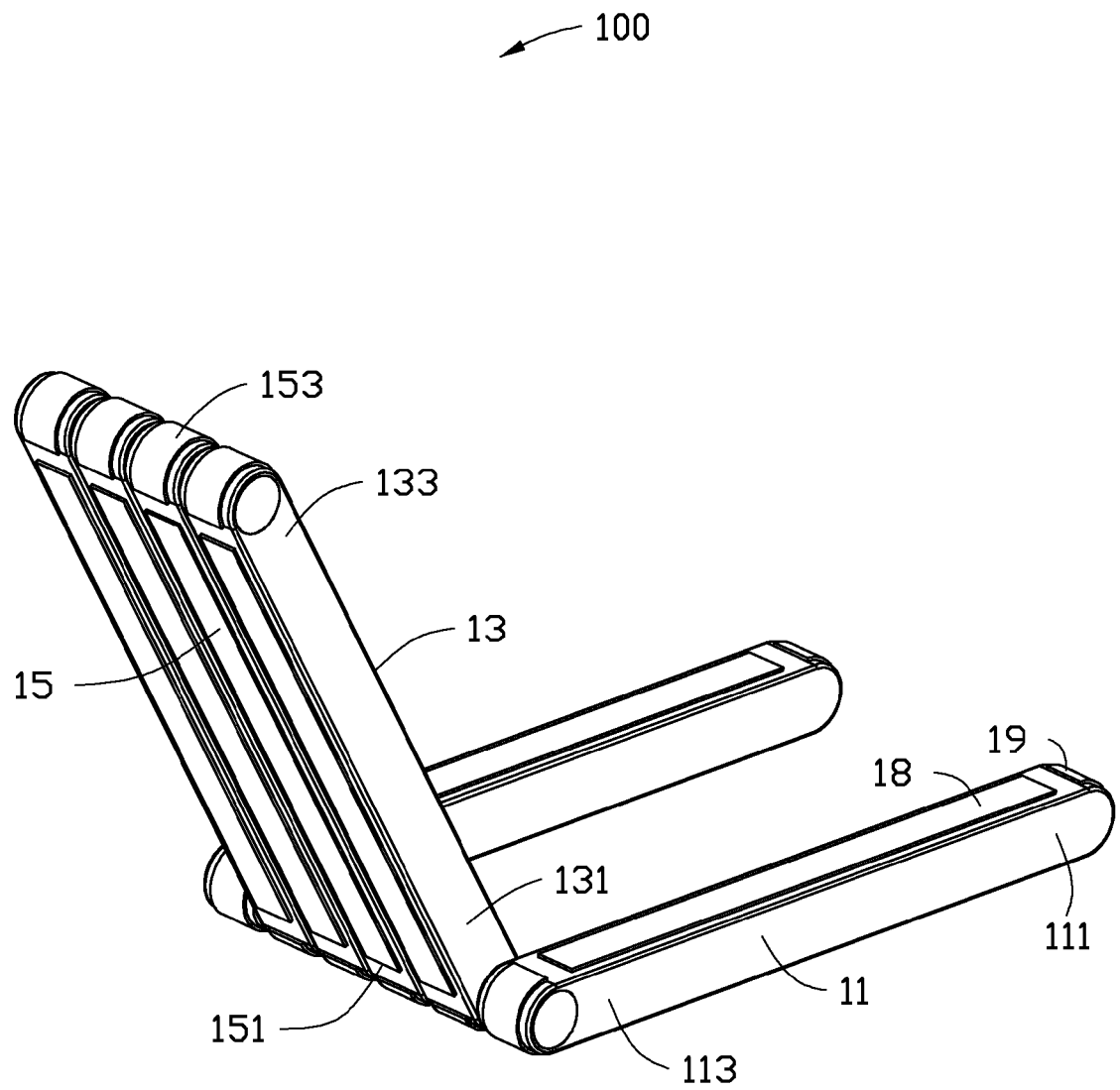
FIG. 7 is an isometric view of the assembled support mechanism of FIG. 1 in a fourth support position.

Referring to FIG. 2, the support mechanism 100 supports a tablet PC in a first support position. In the first support position, the second support ends 153 are positioned between the first support ends 111 and the first joint ends 113. Referring to FIG. 5, the support mechanism 100 is in a second support position. In the second support position, the second support ends 151 and the first support ends 111 are positioned at two sides of the first joint ends 113. Referring to FIG. 6, the support mechanism 100 is in a third support position. In the third support position, the second support ends 151 are located above the first support members 11 to support an electronic device. Referring to FIG. 7, the support mechanism 100 is in a fourth support position. In the fourth support position, the second support members 15 are between the connecting members 13 side by side, and two second support ends 151 are adjacent to the first joint ends 113, the frictional members 18 of the first support members 11 are used for supporting a first edge of an electronic device, the frictional members 18 mounted on the connecting members 13 and second support members 15 are used for supporting a second edge of the electronic device opposite the first edge.

Referring to FIG. 1, to fold the mechanism 100, a fingertip force is applied to press the first support members 11 to the desk, and the second support members 15 are rotated together towards the connecting members 13 until the second support members 15 and the connecting members 13 are flat, and then the first support members 11 are released. The first support members 11 are rotated together towards the connecting members 13 until the first support members 15 and the connecting members 13 are also flat, such that the support mechanism 100 is then folded to occupy the smallest possible space.

Figure 8:
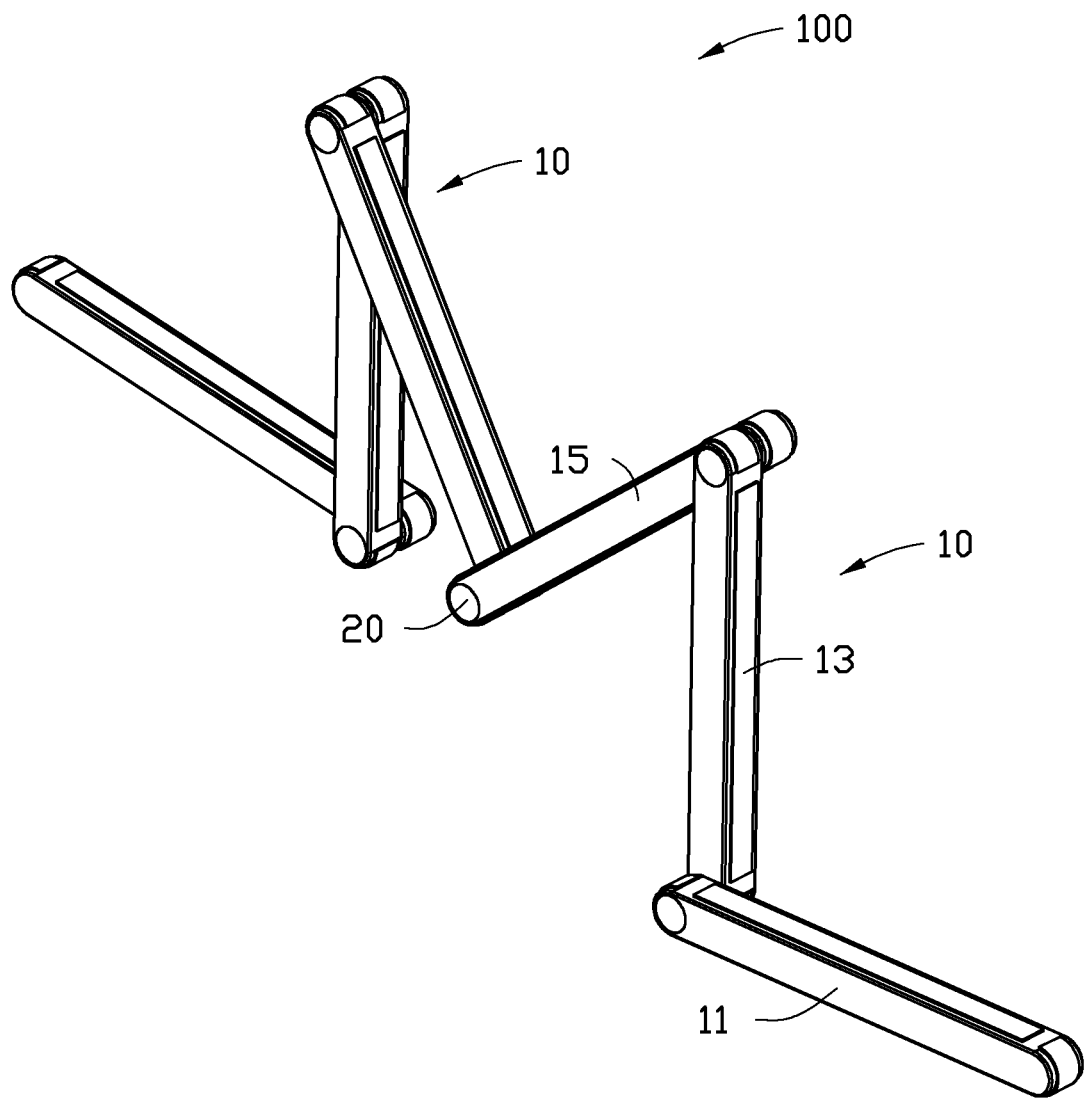
FIG. 8 is an isometric view of the assembled support mechanism of FIG. 1 in an unfolded position.

The support mechanism 100 may be easily folded and is portable. The support mechanism 100 comprises only two support portions 10 and a connecting assembly 20, thus the construction and manufacture of the support mechanism 100 may be very simple. As the second support members 15 may be rotated and fixed at any angle relative to the first support members 11 via the connecting members 13, the electronic device may be positioned at any angle and multiple views may be obtained. When the first support members 11, the connecting members 13 and the second support members 15 are worn, and friction forces between the first support members 11 and the connecting members 13 is less, the connecting members 13 and the second support members 15 may be adjusted via the locking member 178 to engage with the engaging portion 1715 of the pivotal member 171, thus the support mechanism 100 may have longevity in use. Moreover, the frictional members 18 and the anti-skidding members 19 are made of silica gel which may result in a soft feel in the hand and the support mechanism 100 may be placed on a surface with irregularities or is tilted. The support mechanism 100 of FIG. 8 is aesthetically attractive even when in an unfolded state, and may be used for ornamental purposes due to its simplicity and symmetry of structure.

It is to be understood that the anti-skidding member 19 may be formed in the arcuate groove 1133 by injection molding. The frictional member 18 may be formed in the mounting groove 1151 by injection molding. The second support member 15 and the connecting member 13, the connecting member 13 and the first support member 11 may be rotatably connected in other ways, for example, one may comprises a post, the other may define a pivotal hole, and the post may rotatably engage in the pivotal hole.

Finally, while various embodiments have been described and illustrated, the disclosure is not to be construed as being restricted thereto. Various modifications can be made to the embodiments by those skilled in the art without departing from the true spirit and scope of the disclosure as defined by the appended claims.

What is claimed is:

1. A support mechanism, comprising:
a connecting assembly; and
a pair of support portions, each of the pair of support portions comprising a first support member, a connecting member comprising a first connecting end and a second connecting end opposite to the first connecting end, and a second support member; wherein the first support member is rotatably connected to the connecting member at the first connecting end, the second support member is rotatably connected to the connecting member at the second connecting end, and the second support members of each of the pair of support portions are rotatably connected to each other by the connecting assembly, two opposite sides of each of the first support member, connecting member, and the second support member define a pair of mounting grooves; and each of the pair of support portions further comprises a plurality of friction members received in each of the pair of mounting grooves.

2. The support mechanism of claim 1, wherein each of the pair of support portions further comprises two pivotal assemblies; the first support member comprises a first support end, and a first joint end opposite to the first support end; the second support member comprises a second support end, and a second joint end opposite to the second support end; wherein the first joint end is rotatably connected to the first connecting end by one of the two pivotal assemblies, and the second joint end is rotatably connected to the second connecting end by another one of the two pivotal assemblies.

3. The support mechanism of claim 2, wherein each of the first joint end, first connecting end, the second connecting end, the second joint end, and the second support end comprises an arcuate end surface having an arcuate groove on the arcuate end surface; each of the pair of support potions further comprises a plurality of anti-skidding members received in each of the arcuate groove.

4. The support mechanism of claim 3, wherein the plurality of frictional members and the plurality of anti-skidding members are made of silica gel.

5. The support mechanism of claim 2, wherein each of the first joint end, first connecting end, second connecting end, second joint end, and the second support end defines a first pivotal hole; each of the two pivotal assemblies comprises a pivotal member and a locking member; wherein one of the pivotal member extends through each of the first pivotal hole of the first joint end and the first connecting end to engage with one of the locking member, and to rotatably connect the first joint end and the first connecting end; another one of the pivotal member extends through the first pivotal holes of the second joint end and the second connecting end to engage with another one of the locking member, and to rotatably connect the second joint end and the second connecting end.

6. The support mechanism of claim 5, wherein the connecting assembly is similar to the pivotal assembly, and the pivotal member rotatably connects the second joint ends of the pair of support portions by extending through the first pivotal holes and engaging with a locking member.

7. The support mechanism of claim 6, wherein each of the first joint end, first connecting end defines a second pivotal hole and a restricting depression, wherein the first and the second pivotal holes are aligned through opposite sides of the first joint end or the first connecting end; an internal diameter of the second pivotal hole is greater than an internal diameter of the first pivotal hole; the restricting depression and the second pivotal hole communicate with the first pivotal hole and are located at opposite ends of the first pivotal hole; each pivotal member comprises a head portion, and an engaging portion opposite to the head portion; each of the restricting depression of the first joint ends and the first connecting ends faces towards each other; the head portion is received in the second pivotal hole of the first joint end; the engaging portion is received in the second pivotal hole of the first connecting end and engages with one of the locking member.

8. The support mechanism of claim 7, wherein each of the first joint end, first connecting end, the second connecting end, and the second joint end further comprises a latching portion in the second pivotal hole, the latching portion is a cylindrical shell resembling an incomplete circle wherein an incomplete portion of a cylinder of the latching portion defines a latching groove; each of the two pivotal assemblies further comprises a plurality of restricting plates sleeved on the pivotal member, each of the plurality of restricting plates comprises a restricting protrusion protruding from an circular edge of each of the plurality of the restricting plates, wherein one of the plurality of restricting plates is received in the second pivotal hole, and the restricting protrusion is received in the latching groove.

9. The support mechanism of claim 8, wherein the latching groove communicates with the second pivotal hole, the latching portion further comprises an annular resisting surface outside of the second pivotal hole, and the head portion of the pivotal member abuts against the resisting surface.

10. The support mechanism of claim 9, wherein each of the first joint end, the first connecting end, the second connecting end, and the second joint end further defines a restricting groove communicating with the restricting depression; one of the plurality of restricting plates is received in the restricting depression, and the restricting protrusion is received in the restricting groove.

11. A support mechanism, comprising:
A connecting assembly; a pair of support portions, each of the pair of support portions comprising a first support member, a connecting member comprising a first connecting end and a second connecting end, and a second support member; wherein the first support member is rotatably connected to the connecting member at the first connecting end, the second support member is rotatably connected to the connecting member at the second connecting end; the second support member of the pair of support portions is rotatably connected to each other by the connecting assembly; each of the first support member, the connecting member, and the second support member defines a pair of mounting grooves opposite to each other; and
a plurality of anti-skidding members made of silica gel and received in each of the pair of mounting grooves;
wherein, two opposite sides of each of the first support member, the connecting member, and the second support member define a pair of mounting grooves; and each of the pair of support portions further comprises a plurality of friction member received in each of the pair of mounting grooves.

12. The support mechanism of claim 11, wherein each of the pair of support portions further comprises two pivotal assemblies; the first support member comprises a first support end, and a first joint end opposite to the first support end; the second connecting end is opposite to the first connecting end; the second support member comprises a second support end, and a second joint end opposite to the second support end, wherein the first joint end is rotatably connected to the first connecting end by one of the two pivotal assemblies, and the second joint end is rotatably connected to the second connecting end by another one of the two pivotal assemblies.

13. The support mechanism of claim 12, wherein each of the first joint end, the first connecting end, the second connecting end, the second joint end, and the second support end comprises an arcuate end surface, and each defines an arcuate groove on the arcuate end surface; each of the pair of support potions further comprises a plurality of frictional members made of silica gel and received in each of the arcuate groove.

14. The support mechanism of claim 12, wherein each of the first joint end, the first connecting end, the second connecting end, and the second joint end defines a first pivotal hole; each of the two pivotal assembly comprises a pivotal member and a locking member, wherein one of the pivotal member extends into the first pivotal holes of the first joint end and the first connecting end, and engages with one locking member to enable the first joint end and the first connecting end to be rotatably connected to each other; another one of the pivotal member extends into the first pivotal holes of the second joint end and the second connecting end, and engages with the other locking member to enable the second joint end and the second connecting end to be rotatably connected to each other.

15. The support mechanism of claim 14, wherein each of the first joint end, first connecting end defines a second pivotal hole and a restricting depression, wherein the first pivotal hole and the second pivotal hole are aligned through opposite sides of the first joint end or the first connecting end; an internal diameter of the second pivotal hole is greater than an internal diameter of the first pivotal hole; the restricting depression and the second pivotal hole communicate with the first pivotal hole and are at opposite ends of the first pivotal hole; each of the two pivotal members comprises a head portion, and an engaging portion opposite to the head portion; each of the restricting depressions of the first joint end and the first connecting end faces towards each other; the head portion is received in the second pivotal hole of the first joint end; the engaging portion is received in the second pivotal hole of the first connecting end and engages with one locking member.

16. The support mechanism of claim 15, wherein each of the first joint end, and the first connecting end further comprises a latching portion in each of the second pivotal hole; each of the latching portion is a cylindrical shell resembling an incomplete circle wherein an incomplete portion of a cylinder of the latching portion defines a latching groove; each of the two pivotal assemblies further comprises a plurality of restricting plates sleeved on the pivotal member, each of the plurality of restricting plates comprises a restricting protrusion protruding from the circular edge of each of the plurality of restricting plates; one of the plurality of restricting plates is received in the second pivotal hole with the restricting protrusion received in the latching groove.

17. The support mechanism of claim 16, wherein the latching groove communicates with the second pivotal hole, the latching portion further comprises an annular resisting surface outside of the second pivotal hole, and the head portion of the pivotal member abuts against the resisting surface.

18. The support mechanism of claim 17, wherein each of the first joint end, and the first connecting end further defines a restricting groove communicating with the restricting depression; one of the plurality of restricting plates is received in the restricting depression with restricting protrusion received in the restricting groove.

19. A support mechanism, comprising
a connecting assembly; and
a pair of support portions, each of the pair of support portions comprising:
a connecting member comprising a first connecting end and a second connecting end;
a first support member comprising a first support end rotatably connected to the first connecting end of the connecting member;
a second support member rotatably connected to the second connecting end of the connecting member; and
at least one pivotal assembly; wherein the second support members of each of the pair of support portions are rotatably connected to each other by the connecting assembly, each of the first joint end, and first connecting end defines a first pivotal hole; the at least one pivotal assembly comprises a pivotal member and a locking member, the pivotal member extends through each of the first pivotal hole of the first joint end and the first connecting end to engage with the locking member, and to rotatably connect the first joint end and the first connecting end; each of the first joint end and the first connecting end defines a second pivotal hole and a restricting depression, wherein the first and the second pivotal holes are aligned through opposite sides of the first joint end or the first connecting end; an internal diameter of the second pivotal hole is greater than an internal diameter of the first pivotal hole; the restricting depression and the second pivotal hole communicate with the first pivotal hole and are located at opposite ends of the first pivotal hole; the pivotal member comprises a head portion, and an engaging portion opposite to the head portion; each of the restricting depression of the first joint ends and the first connecting ends faces towards each other; the head portion is received in the second pivotal hole of the first joint end; the engaging portion is received in the second pivotal hole of the first connecting end and engages with the locking member.

* * * * *